United States Patent
Siriwardane et al.

(10) Patent No.: US 8,617,499 B1
(45) Date of Patent: Dec. 31, 2013

(54) MINIMIZATION OF STEAM REQUIREMENTS AND ENHANCEMENT OF WATER-GAS SHIFT REACTION WITH WARM GAS TEMPERATURE CO2 REMOVAL

(75) Inventors: Ranjani V. Siriwardane, Morgantown, WV (US); James C. Fisher, II, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 592 days.

(21) Appl. No.: 12/887,827

(22) Filed: Sep. 22, 2010

Related U.S. Application Data

(63) Continuation-in-part of application No. 12/720,766, filed on Mar. 10, 2010, now Pat. No. 8,470,276.

(51) Int. Cl.
*B01D 53/62* (2006.01)
*B01D 53/78* (2006.01)
*B01D 53/96* (2006.01)

(52) U.S. Cl.
USPC ............ 423/225; 423/220; 423/224; 423/230

(58) Field of Classification Search
USPC .................. 423/220, 225, 230, 224; 429/420
See application file for complete search history.

(56) References Cited

U.S. PATENT DOCUMENTS

| | | | |
|---|---|---|---|
| 6,090,312 A | 7/2000 | Ziaka et al. | |
| 7,011,694 B1 | 3/2006 | Ho | |
| 7,354,562 B2 | 4/2008 | Ying et al. | |
| 2008/0003466 A1* | 1/2008 | Stevens et al. | 429/13 |

OTHER PUBLICATIONS

Sato et al., "Hydrogen production from heavy oil in the presence of calcium hydroxide," Fuel 82 (2003) 561-567.
Shi-Ying Lin, "Progress of HyPr-RING Process Development for Hydrogen Production from Fossil Fuels," Japan Coal Energy Center publication, presented at 16th Annual World Hydrogen Energy Conference, Jun. 13-16, Lyon, France, 2006 (presentation date and venue based on cite recorded at Ram B. Gupta, Hydrogen Fuel: Production, Transport, and Storage 125 (2009) ).

* cited by examiner

*Primary Examiner* — Stuart Hendrickson
*Assistant Examiner* — Daniel Berns
(74) *Attorney, Agent, or Firm* — James B. Potts; Brian J. Lally; John T. Lucas

(57) ABSTRACT

The disclosure utilizes a hydroxide sorbent for humidification and $CO_2$ removal from a gaseous stream comprised of CO and $CO_2$ prior to entry into a water-gas-shift reactor, in order to decrease $CO_2$ concentration and increase $H_2O$ concentration and shift the water-gas shift reaction toward the forward reaction products $CO_2$ and $H_2$. The hydroxide sorbent may be utilized for absorption of $CO_2$ exiting the water-gas shift reactor, producing an enriched $H_2$ stream. The disclosure further provides for regeneration of the hydroxide sorbent at temperature approximating water-gas shift conditions, and for utilizing $H_2O$ product liberated as a result of the $CO_2$ absorption.

17 Claims, 4 Drawing Sheets

MINIMIZATION OF STEAM REQUIREMENTS AND ENHANCEMENT OF WATER-GAS SHIFT REACTION WITH WARM GAS TEMPERATURE CO2 REMOVAL

RELATION TO OTHER APPLICATIONS

This patent application is a continuation-in-part of and claims priority from nonprovisional patent application Ser. No. 12/720,766, filed Mar. 10, 2010 by Siriwardane et al, and which is hereby incorporated by reference in its entirety.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments of the present invention relates to a hydroxide sorbent for humidification and $CO_2$ removal from a gaseous stream comprised of CO and $CO_2$ prior to entry into a water-gas-shift reactor, in order to decrease $CO_2$ concentration and increase $H_2O$ concentration and shift the water-gas shift reaction toward the forward reaction products $CO_2$ and $H_2$. The hydroxide sorbent may be further utilized for absorption of $CO_2$ exiting the water-gas shift reactor to produce an enriched $H_2$ stream, and may be regenerated at temperatures approximating water-gas shift conditions.

BACKGROUND

The water-gas shift (WGS) reaction is a chemical reaction in which carbon monoxide (CO) reacts with water vapor ($H_2O$) to form carbon dioxide ($CO_2$) and hydrogen ($H_2$). The water-gas shift reaction is a highly significant industrial reaction, and is used in conjunction with reforming of methane and other hydrocarbons for the production of high purity hydrogen, among other applications.

The shift reaction is equilibrium limited and the extent of CO-conversion is dependent on the temperature in the WGS reactor utilized, and the temperature is typically such that the water vapor in the reaction exists as steam. In terms of pure stochiometry, the shift reaction requires at least a steam-to-CO ratio of 1 to proceed, however the equilibrium for $H_2$ production is favored by high moisture content. Additionally, higher ratios may be utilized to avoid carbon deposition at a catalyst surface and formation of larger hydrocarbon molecules, among other operational reasons. Adequate performance typically requires that steam be present significantly in excess of the minimum stiochiometric ratio, and ratios equal or higher than two are frequently utilized.

The water-gas shift reaction is commonly utilized following gasification, where a fuel is converted into gaseous components by applying heat under pressure and chemically decomposing the fuel to produce synthesis gas (syngas) comprised of $H_2$, CO, $CO_2$, and other gaseous constituents. Following cooldown from gasification temperatures, the syngas may then be processed in a water-gas-shift reactor, where the CO and steam react to produce additional $CO_2$ and increase the $H_2$ concentration. Steam may be present in the syngas stream and may act to supply a portion of the steam-to-CO ratio required in the water-gas shift reactor, however typically an additional steam source is required in order to meet a steam-to-CO ratio that is operationally desired. Often the steam is generated during the syngas cooldown from the temperature condition of the gasifier to the desired temperature condition in the water-gas shift reactor, or it may be supplied directly from an alternate source. In terms of overall efficiency, this additional steam requirement is a parasitic load with a negative impact. Regardless of the origin, the requirement for additional steam consumes thermal energy which could be utilized to supply other steam loads.

Techniques exist to mitigate the requirement for additional steam sources. For example, water slurry feed gasification systems generate a more humid syngas, and often additional steam is not required for WGS reactor operation. However, a water slurry feed system results in thermal efficiency losses, and this problem is especially exacerbated with low ranked coals that already have a high water content. Another technique utilizes a dry feed gasifier to avoid the thermal efficiency losses, and injects water droplets into the relatively dry syngas in order to provide syngas cooldown and humidify the syngas stream. This humidification reduces the quantity of steam injection subsequently required for WGS reactor operation, and can somewhat mitigate the negative impact on plant efficiency. However, the careful balancing of the required thermal transfer to the injected water droplets for syngas cooldown and the resulting steam-to-CO ratio of the cooled syngas subsequently sent downstream may still require additional steam injection before encountering the WGS reactor. See e.g. Martelli et al, "Comparison of coal IGCC with and without CO2 capture and storage: Shell gasification with standard vs. partial water quench", *Energy Procedia* 1 (2009).

It would provide a significant advantage to provide a process whereby a syngas stream comprised of CO, $CO_2$, and $H_2$ could be humidified prior to entering a WGS reactor, in order to reduce or eliminate parasitic steam injection into the syngas stream.

There has also been significant effort toward removing the $CO_2$ present in syngas streams prior to WGS reactor entry in order to enhance $H_2$ production. The water-gas shift is a reversible, equilibrium-limited reaction, and thus becomes hindered when the concentration of $CO_2$ in the stream increases. As is well understood, if the concentration of $CO_2$ in the syngas stream is reduced prior to entry into the WGS reactor, the equilibrium of the water-gas shift reaction is shifted in favor of the forward reaction products, and conversion of CO and $H_2O$ to $CO_2$ and $H_2$ increases in the WGS reactor. One practiced approach is the use of a $CO_2$-selective membrane on the syngas stream in order to remove some portion of the present $CO_2$ prior to WGS reactor entry. See U.S. Pat. No. 7,011,694 to Ho, issued Mar. 14, 2006, among others. Similarly, water-gas shift membrane reactors (WGS-MR) utilize membranes to remove either $H_2$ or $CO_2$ as they generate in-situ in the reactor, shifting the equilibrium toward greater conversion to $H_2$. See U.S. Pat. No. 6,090,312 to Ziaka et al, issued Jul. 18, 2000, among others. These approaches effectively act to remove $CO_2$ or $H_2$ and shift the equilibrium favorably, however preparing thin and durable membranes is a challenge, and higher temperature operation can be difficult. An alternate approach utilizes a $CO_2$ sorbent such as lime or dolomite for $CO_2$ removal. See U.S. Pat. No. 7,354,562 to Ying et al, issued Apr. 8, 2008, among others. Like the membrane approaches, $CO_2$ removal is realized, however these methods do not act to mitigate any additional steam injection into the syngas stream that may be required.

It would provide a significant advantage to provide a process whereby $CO_2$ removal from a syngas stream comprised of CO, $CO_2$, and $H_2$ could be accomplished in a manner that further humidifies the syngas prior to entering a WGS reactor, in order to shift the water-gas shift reaction favorably while simultaneously reducing or eliminating steam injection requirements into the syngas stream.

There are similarly gasification processes which report the removal of $CO_2$ and the production of an enriched $H_2$ product through the use of $CO_2$ sorbents within a coal gasification reactor. For example, calcium hydroxide ($Ca(OH)_2$) has been used for the sorption of $CO_2$ with liberation of $H_2O$ in coal gasification products, in order to absorb $CO_2$ as it originates during gasification and provide an $H_2$ enriched product. In these processes the molecular dispersion of the organic and oxidant reactants is conducive to rapid oxidation reactions and high $H_2$ production, and the use of a separate water-gas-shift step can be avoided. However, the process is most successful under supercritical conditions, which imposes severe operational requirements. Under subcritical conditions, the process tends to produce a higher level of methane, which would likely necessitate WGS reactor operations following methane reforming in order to optimize the production of $H_2$. See Kuramoto et al, "Coal gasification with subcritical steam in the presence of a $CO_2$ sorbent: products and conversion under transient heating," *Fuel Processing Technology* 82 (2003). In the subcritical operation, a methodology whereby a sorbent removes $CO_2$ and humidifies the syngas stream prior to entry into the WGS reactor would continue to remain valuable.

In an integrated plant such as an IGCC which utilizes a WGS reactor to boost the hydrogen concentration prior to hydrogen combustion, carbon capture strategies also impose negative impacts on overall plant efficiency, as is well known. The impacts are worsened when the carbon capture strategy requires absorption of $CO_2$ at low temperature and desorption at low pressure, and/or utilizes a solvent sensitive to water content in the synthesis gas stream, necessitating water removal operations. These impacts exist in both pre-combustion and post-combustion carbon capture strategies, although pre-combustion capture in an IGCC plant offers distinct advantages, because the $CO_2$ is relatively concentrated in the WGS reactor exit stream and the driving force for various types of separation and capture technologies is significantly improved. As a result, there are significant efficiency advantages to using a $CO_2$ capture sorbent operable at WGS reactor temperatures for pre-combustion capture in an IGCC plant. It would be further advantageous if the sorbent material utilized for $CO_2$ absorption and humidification of the syngas stream prior to entry into the WGS reactor was additionally utilized for $CO_2$ capture following exit from the WGS reactor, so that regeneration and $CO_2$ separation for both processes could occur under similar conditions, and so that the regeneration processes could be combined in order to mitigate energy and resource requirements arising from cyclic use of the sorbent material for both before and after a water-gas shift reaction.

Accordingly, it is an object of this disclosure to provide a process whereby a gaseous stream comprised of CO and $CO_2$ can be humidified prior to entering a WGS reactor, in order to reduce or eliminate parasitic steam injection into the gaseous stream.

Further, it is an object of this disclosure to provide a process whereby $CO_2$ removal from a gaseous stream comprised of CO and $CO_2$ can be accomplished during the humidification process, in order to shift the water-gas shift reaction toward the favorable forward reaction products.

Further, it is an object of this disclosure to utilize a sorbent material for both $CO_2$ absorption and humidification of the gaseous stream prior to entry into the WGS reactor, and to further utilize the sorbent material for $CO_2$ capture following exit from the WGS reactor, in order to produce an enriched $H_2$ stream.

Further, it is an object of this disclosure to conduct $CO_2$ absorption, gaseous stream humidification, and $CO_2$ capture following the WGS reactor using a sorbent regenerable to approximate WGS reactor temperature and pressure conditions, in order to mitigate energy penalties associated with $CO_2$ capture and sequestration.

Further, it is an object of this disclosure to conduct $CO_2$ absorption, gaseous stream humidification, and $CO_2$ capture using a sorbent which tolerates $H_2O$ in the gaseous stream, in order to mitigate water removal requirements and allow operation of $H_2O$ containing streams, such as a syngas stream comprised $H_2$, CO, $CO_2$, and $H_2O$.

These and other objects, aspects, and advantages of the present disclosure will become better understood with reference to the accompanying description and claims.

SUMMARY

The process as disclosed herein utilizes a hydroxide sorbent for humidification and $CO_2$ removal from a gaseous stream comprised of CO and $CO_2$ prior to entry into a water-gas-shift reactor, in order to decrease $CO_2$ concentration and increase $H_2O$ concentration and shift the water-gas shift reaction toward the forward reaction products $CO_2$ and $H_2$. The disclosure further utilizes the hydroxide sorbent for absorption of $CO_2$ exiting the water-gas shift reactor, producing an enriched $H_2$ stream. The process further provides for regeneration of the hydroxide sorbent at temperature approximating water-gas shift conditions, and utilizing $H_2O$ product liberated as a result of the $CO_2$ absorption, reducing energy requirements associated with the $CO_2$ capture and sequestration, and reducing water requirements for rehydroxylation during the regeneration.

Within this process, a first gaseous stream comprised of CO and $CO_2$ contacts a first hydroxide sorbent, causing $CO_2$ to be absorbed and $H_2O$ to be generated, resulting in a second gaseous stream having a reduced $CO_2$ content and an increased $H_2O$ content and providing more favorable conditions for the production of $H_2$ from the water-gas shift reaction. The second gaseous stream enters a water-gas shift reactor where the constituents CO and $H_2O$ undergo the water-gas shift reaction, producing $H_2$ and $CO_2$. By virtue of contact with the hydroxide sorbent, the reduced $CO_2$ content and the increased $H_2O$ content of the second gaseous stream thereby provide more favorable conditions for the production of $H_2$ from the water-gas shift reaction.

The water-gas shift reactor exhausts a third gaseous stream, and the third gaseous stream may contact a second hydroxide sorbent, causing $CO_2$ to be absorbed and $H_2O$ to be generated, and producing a fourth gaseous stream having an increased concentration of $H_2$ and $H_2O$ over the third gaseous stream. The $H_2O$ in the fourth gaseous stream may be utilized for regeneration/rehydroxylation of the first and second hydroxides in certain embodiments. $H_2$ in the fourth gaseous stream may be sent to a power island for combustion and subsequent power generation $CO_2$ absorption by the hydroxide sorbents forms a solid carbonate. In certain embodiments, the solid carbonate is thermally decomposed to form an oxide and a gaseous $CO_2$. The disclosure further provides for the $CO_2$ capture using a sorbent regenerable at approximate WGS reactor temperature and pressure conditions, in order to mitigate energy penalties associated with $CO_2$ capture and sequestration. Further, sorbents utilized in certain embodiments tolerates $H_2O$ in the gaseous stream and mitigates water removal requirements for operation on H₂O containing streams, such as syngas streams comprised H₂, CO, CO₂, and H₂O.

The novel process and principles of operation are further discussed in the following description.

DETAILED DESCRIPTION

Figure 1:
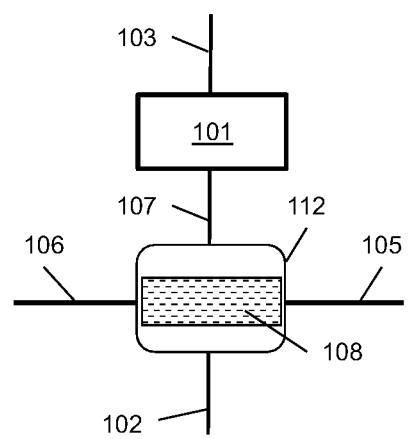
FIG. 1 illustrates a first absorption reactor utilized prior to a water-gas shift reactor.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process whereby a gaseous stream comprised of CO and CO₂ contact a hydroxide sorbent to increase H₂O concentrations and decrease CO₂ concentrations, and thereby provide a more favorable equilibrium for subsequent H₂ production in a water-gas shift reactor.

The disclosure herein describes a process whereby a first gaseous stream comprised of CO and CO₂ contacts a hydroxide sorbent, causing CO₂ to be absorbed and H₂O to be generated, resulting in a second gaseous stream having a reduced CO₂ content and an increased H₂O content. The second gaseous stream enters a water-gas shift reactor where the constituents CO and H₂O undergo the water-gas shift reaction, producing H₂ and CO₂. By virtue of contact with the hydroxide sorbent, the reduced CO₂ content and the increased H₂O content of the second gaseous stream thereby provide more favorable conditions for the production of H₂ from the water-gas shift reaction.

The water-gas shift reactor exhausts a third gaseous stream, and the third gaseous stream may contact a second hydroxide sorbent, causing CO₂ to be absorbed and H₂O to be generated, and producing a fourth gaseous stream having an increased concentration of H₂ and H₂O over the third gaseous stream. The H₂O in the fourth gaseous stream may be utilized for regeneration of the first and second hydroxides in certain embodiments.

CO₂ absorption by the hydroxide sorbents forms a solid carbonate. In certain embodiments, the solid carbonate is thermally decomposed to form an oxide and a gaseous CO₂. In certain embodiments, the oxide is hydroxylated with steam, and further with H₂O in the fourth gaseous stream. Following use in the rehydroxylation, H₂ in the fourth gaseous stream is sent to a power island for combustion and subsequent power generation.

As is understood, the water-gas shift reaction in the water-gas shift reactor is a moderately exothermic reversible reaction. The reaction is thermodynamically favored at low temperatures and kinetically favored at high temperatures. Since there is no change in the volume from reactants to products, the reaction is not affected by pressure. The process is often divided into a low temperature shift and a high temperature shift, however in hydrogen plants a single medium temperature shift reactor is frequently the preferred solution for optimisation of the hydrogen yield.

The water-gas shift reactor facilitates a reaction in which carbon monoxide reacts with water vapor to form carbon dioxide and hydrogen:

$$CO + H_2O \leftrightarrow CO_2 + H_2 \qquad (1)$$

The reaction is reversible and the chemical equilibrium is subject to Le Chatelier's principle, so that removal of CO₂ from the gas stream as well as increasing the H₂O concentration tends to drive the reaction toward the forward reaction products CO₂ and H₂. Additionally, although stoichiometrically the reaction requires at least an H₂O to CO ratio of 1 to proceed, higher ratios are typically used in order to avoid the appearance of secondary reactions such as methanation or CO disproportionation, which may alter the selectivity to H₂ and CO₂, and deactivate catalysts by carbon deposition. Steam to CO ratios of at least two are frequently required.

Generally speaking, any mechanism for the removal of CO₂ drives reaction (1) toward the forward reaction products of CO₂ and H₂. The disclosure herein utilizes a hydroxide sorbent for the removal of CO₂ from a gaseous stream prior to entering a water-gas shift reactor, where reaction (1) occurs. The hydroxide sorbent contacts CO₂ in the gaseous stream and under the appropriate temperature and pressure conditions forms a solid carbonate and water, generated as steam:

$$M(OH)_2 + CO_2 \rightarrow MCO_3 + H_2O \qquad (2)$$

where M is one or more elements comprising the alkaline and alkaline earth metals of the periodic table. Alkaline and alkaline earth metal hydroxides are known to be highly effective CO₂ absorbers, with varying solubility, stability, and basic strength depending on the alkaline or alkaline earth metal utilized. In a particular embodiment of this disclosure, M is the alkaline earth metal magnesium. However, the disclosure provided herein is not limited by the particular alkaline or alkaline earth metal utilized, and it is understood that a particular alkaline or alkaline earth metal may be selected based on the prevailing conditions of the gaseous stream, operationally present temperature and pressure conditions, or other prevailing conditions within an integrated cycle. Within this disclosure, it is only necessary that the alkaline or alkaline earth metal in the hydroxide sorbent provide for CO₂ absorption and production of a solid carbonate and water based on contact between the hydroxide sorbent and a gaseous stream comprised of CO₂, in accordance with reaction (2).

The disclosure herein provides for CO₂ absorption utilizing reaction (2) in order to reduce the CO₂ concentration of a gaseous stream as well as increase the H₂O concentration of the gaseous stream, so that a subsequent water-gas shift reaction according to reaction (2) may occur under conditions more favorable for the production of the forward reaction products CO₂ and H₂. In an embodiment, a second CO₂ absorption occurs according to reaction (2) following the water-gas shift of reaction (1), removing some portion of the CO₂ generated by reaction (1) and generating a more refined H₂ stream. Additionally, the second CO₂ absorption further liberates additional H₂O, which may be utilized to mitigate H₂O requirements in a regeneration cycle requiring rehydroxylation following thermal decomposition of the solid carbonate to an oxide and a gaseous CO₂.

In the following descriptions and as used herein, the term "hydroxide sorbent" and the term "$n^{TH}$ hydroxide," where $n^{TH}$ refers to a sequential designator such as first, second, third, etc., means an inorganic compound having the chemical formula or which results in the chemical formula $M(OH)_2$ that forms a carbonate $MCO_3$ on exposure to gaseous $CO_2$ under prevailing temperature and pressure conditions, and where M is one or more elements comprising the alkaline earth metals or alkaline metals of the periodic table: beryllium (Be), magnesium (Mg), calcium (Ca), strontium (Sr), barium (Ba), radium (Ra), lithium (Li), sodium (Na), potassium (K), rubidium (Rb), caesium (Cs), and francium (Fr).

Similarly, in the following descriptions and as used herein, the term "oxide" and the term "$n^{TH}$ oxide," where $n^{TH}$ refers to a sequential designator such as first, second, third, etc., means a compound having the chemical formulate MO, where M is comprised of elements comprising the alkaline earth metals or alkaline metals of the periodic table: beryllium (Be), magnesium (Mg), calcium (Ca), strontium (Sr), barium (Ba), radium (Ra), lithium (Li), sodium (Na), potassium (K), rubidium (Rb), caesium (Cs), and francium (Fr).

Similarly, in the following descriptions and as used herein, the term "solid carbonate" and the term "$n^{TH}$ solid carbonate," where $n^{TH}$ refers to a sequential designator such as first, second, third, etc., means a compound having the chemical formulate $MCO_3$, where M is comprised of elements comprising the alkaline earth metals or alkaline metals of the periodic table: beryllium (Be), magnesium (Mg), calcium (Ca), strontium (Sr), barium (Ba), radium (Ra), lithium (Li), sodium (Na), potassium (K), rubidium (Rb), caesium (Cs), and francium (Fr), and where the solid carbonate thermally decomposes under sufficient temperature and pressure conditions to form an oxide MO and a gaseous $CO_2$.

FIG. 1 illustrates a particular embodiment where first gaseous stream 102 comprised of CO and $CO_2$ enters absorption reactor 112. Absorption reactor 112 contains hydroxide sorbent 108. First gaseous stream 102 contacts hydroxide sorbent 108 in absorption reactor 112, and absorption reactor 112 maintains a temperature and pressure conditions such that the contact between first gaseous stream 102 and hydroxide sorbent 108 produces solid carbonate and water product in accordance with reaction (2), where the temperature condition is such that the water product exists as a generated steam. Within absorption reactor 112, contact between first gaseous stream 102 and hydroxide sorbent 108 thus produces the generated steam and substantially removes $CO_2$ in first gaseous stream 102 through the formation of the solid carbonate, in accordance with reaction (2). The remaining gaseous constituents, the generated steam, and the solid carbonate are then separated, and a second gaseous stream 107 is discharged from absorption reactor 112.

Second gaseous stream 107 is comprised of CO from first gaseous stream 102 and generated steam resulting from the formation of the solid carbonate via reaction (2). Second gaseous stream 107 may be further comprised of $CO_2$, however the amount is significantly reduced over that of first gaseous stream 102 by the amount consumed in the formation of the solid carbonate. As a result, the $H_2O$ content of second gaseous stream 107 is increased over first gaseous stream 102, and the $CO_2$ content of second gaseous stream 107 is decreased below first gaseous stream 102. The composition of second gaseous stream 107 thereby presents a more favorable composition for the conversion of CO and $H_2O$ to $CO_2$ and $H_2$ in a water-gas shift reaction.

Second gaseous stream 107 is discharged from absorption reactor 112 to water gas shift reactor 101. Water gas shift reactor 101 is under a temperature and pressure condition sufficient to generate the water gas shift reaction between the CO and generated steam comprising second gaseous stream 107, and produces a $CO_2$ product and generated $H_2$ via reaction (1). A third gaseous stream 103 is discharged from water gas shift reactor 101 comprised of the generated $H_2$ and the $CO_2$ product. Third gaseous stream 103 thus contains the $H_2$ generated by the water-gas shift reaction, and an increased amount of $CO_2$ as compared to second gaseous stream 107.

The process presented at FIG. 1 thus provides a method whereby a hydroxide sorbent both removes $CO_2$ and favorably increases the $H_2O/CO$ ratio in a gaseous stream without the direct injection of $H_2O$ into the gaseous stream, shifting the water-gas shift reaction within water-gas shift reactor 101 toward a more favorable equilibrium for increased $H_2$ production. The method avoids or mitigates the requirement for steam injection into the gaseous stream prior to water-gas shift reactor 101, and reduces or eliminates parasitic steam loading which may be negatively impacting the efficiency of an overarching process, such as an IGCC plant utilizing a WGS reactor to maximize $H_2$ conversion in a syngas stream.

The first gaseous stream 102 may be further comprised of some amount of existing $H_2$ and $H_2O$, so that the process as described above acts to increase the concentration of $H_2O$ prior to water-gas-shift reactor 101 and increases the concentration of $H_2$ following the water-gas-shift reactor 101, while decreasing the concentration of $CO_2$ via reaction (2). For example, first gaseous stream 102 may be a syngas stream comprised primarily of $H_2$, CO, $CO_2$, and $H_2O$, and the resulting third gaseous stream 103 may be shifted syngas comprised primarily of $H_2$, $CO_2$, and $H_2O$.

As discussed, hydroxide sorbent 108 may be any hydroxide which acts to absorb $CO_2$ and release $H_2O$ according to reaction (2) under the conditions maintained in first absorption reactor 112. For example, hydroxide sorbent 108 may be an alkaline earth metal hydroxide. In a particular embodiment, hydroxide sorbent 108 is magnesium hydroxide (Mg$(OH)_2$) and contact between hydroxide sorbent 108 and first gaseous stream 102 occurs at a temperature from about 150° C. to about 315° C. In another embodiment, the contact occurs at a pressure exceeding about 10 atmospheres.

First absorption reactor 112 may be any vessel known in the art and sufficient to accept a gaseous stream, initiate contact between the gaseous stream and the hydroxide sorbent contained within, and discharge a gaseous stream subsequent to the contact, while maintaining pressure and temperature conditions sufficient for reaction (2) to proceed as a result of the contact. For example, first absorption reactor 112 may be a packed or fluidized bed reactor, or may incorporate moving beds for transport of hydroxide sorbent 108 into and solid carbonate out of the absorption reactor. The absorption reactor may further be comprised of direct or indirect heat exchangers for the removal of exothermic heat generated as a result of reaction (2). For example, first absorption reactor 112 may include an indirect heat exchanger removing exothermic heat via cooling water within the heat exchanger tubes. Within this method, it is only necessary that first absorption reactor 112 accept a gaseous stream, facilitate contact between the gaseous stream and a sorbent operating, and discharge a gaseous stream subsequent to the contact.

Water-gas shift reactor 101 may be any water-gas shift reactor known in the art and sufficient to accept a gaseous stream, maintain pressure and temperature conditions sufficient to drive a water-gas shift described by reaction (1) toward the forward equilibrium products $CO_2$ and $H_2$, and discharge a gaseous stream subsequent to the water-gas shift reaction. Water-gas shift reactor 101 may incorporate any applicable water-gas shift reaction catalysts, such as iron or copper based catalysts, or other catalysts as are known in the art. Water-gas shift reactor 101 may further be a water-gas shift membrane reactor (WGS-MR) incorporating selective membranes for a degree of in-situ removal of $H_2$ or $CO_2$, as are known in the art. Within this method, it is only necessary that water-gas shift reactor 101 accept a gaseous stream, maintain conditions sufficient to drive a water-gas shift reaction in accordance with reaction (1) toward the forward equilibrium products $CO_2$ and $H_2$, and discharge a gaseous stream subsequent to the water-gas shift reaction.

In an embodiment, the hydroxide sorbent is magnesium hydroxide, and the first gaseous stream 102, the first absorption reactor 112, and the water-gas shift reactor 101 are maintained at a temperature from about 150° C. to about 315° C. However, the temperature and pressure of the first gaseous stream 102, the first absorption reactor 112, and the water-gas shift reactor 101 are not limiting within this method, provided that the temperatures and pressures maintained allow reaction (2) to occur within first absorption reactor 112 and reaction (1) to occur in water-gas shift reactor 101 in the forward direction.

In a process operation, hydroxide sorbent 108 may be deposited into and the solid carbonate removed from the first absorption reactor 112 in a batch or continuous fashion. In the embodiment illustrated at FIG. 1, the hydroxide sorbent 108 enters first absorption reactor 112 at inlet 106 and the resulting solid carbonate exits at outlet 105 in a continuous fashion. Transport via inlet 106 and outlet 105 may be accomplished in a variety of ways, including moving bed arrangements, fluidized transfer of pellets, or other means known to those skilled in the art.

It is understood that the material exiting at outlet 105 may be comprised of both the solid carbonate and unreacted hydroxide sorbent, and that the production of the solid carbonate within first absorption reactor 112 depends largely on the sorbent utilization factor for hydroxide sorbent 108. The sorbent utilization factor communicates the accessibility of the active hydroxide sites within the hydroxide sorbent 108, so that solid carbonate may result from reaction (2). Those skilled in the art recognize that the sorbent utilization factor may be impacted by a variety of factors within first absorption reactor 112, and that maximizing the sorbent utilization factor is desired in order to maximize the $CO_2$ absorbed and minimize the quantity of hydroxide sorbent required. However, the process as disclosed herein is not limited by a specific sorbent utilization factor arising from conditions within first absorption reactor 112. Within this process, it is only necessary that the sorbent utilization factor is sufficient so that some portion of the $CO_2$ in first gaseous stream 102 reacts with some portion of hydroxide sorbent 108 to form the solid carbonate.

In a particular embodiment of the method as illustrated at FIG. 1, first absorption reactor 112 is maintained at a temperature of about 210° C. and a pressure of about 280 psig, and hydroxide sorbent 108 is magnesium hydroxide. First gaseous stream 102 is a syngas stream comprised of approximately 27.2% CO, 11.9% $CO_2$, 26.5% $H_2$, and 34.4% $H_2O$, where quantities are represented as mole percentages. First gaseous stream 102 enters first absorption reactor 112 and contacts hydroxide sorbent 108, and reaction (X) absorbs $CO_2$ and produces $H_2O$ as a generated stream, producing second gaseous stream 107 possessing increased $H_2O$ and decreased $CO_2$. In this embodiment, second gaseous stream 107 is comprised of 27.2% CO, 0.6% $CO_2$, 26.5% $H_2$, and 45.7% $H_2O$. Second gaseous stream 107 enters water-gas shift reactor 101 and undergoes reaction (1), producing third gaseous stream 103 comprised of 0.2% CO, 27.6% $CO_2$, 53.5% $H_2$, and 18.7% $H_2O$. In this embodiment, first gaseous stream 102, second gaseous stream 107, and third gaseous stream 103 have a total molar flow of 31,160,548 moles-per-hour (mol/h), and the magnesium hydroxide serving as hydroxide sorbent 108 enters first absorption reactor 112 at a rate of 972,992 kilograms-per-hour (kg/h). A 31% sorbent utilization factor is assumed, which was observed in experimental testing.

Figure 2:
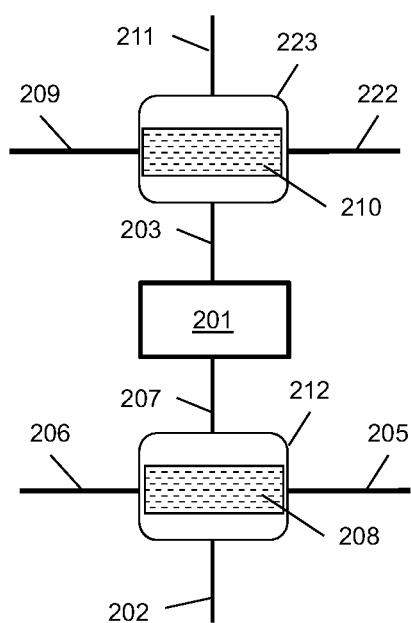
FIG. 2 illustrates a first absorption reactor utilized prior to a water-gas shift reactor and a second absorption reactor utilized following a water-gas shift reactor.

In a further embodiment illustrated at FIG. 2, a first gaseous stream 202 contacts a first hydroxide sorbent 208 in a first absorption reactor 212 as described above, producing a first solid carbonate and a first water product according to reaction (2), and producing a second gaseous stream 207 having increased $H_2O$ and being substantially free of $CO_2$. First hydroxide sorbent 208 enters first absorption reactor 212 at inlet 206 and the resulting solid carbonate exits at outlet 205 in a continuous fashion. As before, second gaseous stream 207 then enters water-gas shift reactor 201 to produce a third gaseous stream 203 comprised primarily of $H_2$ and $CO_2$ via reaction (1). In order to enrich the stream further, the third gaseous stream 203 enters second absorption reactor 223 containing second hydroxide sorbent 210. Third gaseous stream 203 contacts second hydroxide sorbent 210 in second absorption reactor 223, and second absorption reactor 223 maintains a temperature and pressure condition such that the contact between third gaseous stream 203 and second hydroxide sorbent 210 produces a second solid carbonate and a second water product, where the temperature condition is such that the water product exists as a generated steam. Within absorption reactor 223, contact between third gaseous stream 203 and second hydroxide sorbent 210 thus substantially removes $CO_2$ in third gaseous stream 203 through formation of the second solid carbonate, in accordance with reaction (2). This contact results in fourth gaseous stream 211, comprised primarily of $H_2$ and $H_2O$. The second absorption reactor 223 thus serves to remove $CO_2$ from the product of the water-gas shift reactor 201, further enriching the fourth gaseous stream 211 for $H_2$ production.

In the embodiment illustrated at FIG. 2, the first and second absorption reactors in conjunction with the water-gas shift reactor act in a coordinated manner to optimize $H_2$ production from a gaseous stream comprised of CO and $CO_2$. Contact with a first hydroxide sorbent removes $CO_2$ and increases the $H_2O$ concentration in the gaseous stream, establishing concentrations among the gaseous constituents which establish a more favorable equilibrium for the forward reaction products of the subsequent water-gas shift reaction. Following the water-gas shift reaction, where $H_2$ and $CO_2$ are produced, contact with the second hydroxide sorbent removes $CO_2$ generated in the WGS reactor, resulting in an enriched $H_2$ stream. The addition of $H_2O$ and the removal of $CO_2$ is accomplished via reaction (2), which absorbs $CO_2$ and liberates $H_2O$ in the process of forming a solid carbonate. As before, the first gaseous stream 202 may be further comprised of some amount of existing $H_2$ and $H_2O$, so that the process as described above acts to increase the concentration of $H_2O$ prior to water-gas-shift reactor 201 and increase the concentration of $H_2$ following the water-gas-shift reactor 201, while decreasing the concentration of $CO_2$ via reaction (2). For example, first gaseous stream 202 may be a syngas stream comprised primarily of $H_2$, CO, $CO_2$, and $H_2O$, such that the third gaseous stream 203 is a shifted syngas comprised primarily of $H_2$, $CO_2$, and $H_2O$, and such that fourth gaseous stream 211 is a concentrated $H_2$ stream comprised primarily of $H_2$ and $H_2O$.

Similar to the first hydroxide sorbent, the second hydroxide sorbent 210 may be any hydroxide which acts to absorb $CO_2$ and releases $H_2O$ under the conditions maintained in the second absorption reactor 223. Second hydroxide sorbent 210 may have the same composition as first hydroxide sorbent 208, or may differ in composition. In a particular embodiment, second hydroxide sorbent 210 is magnesium hydroxide (Mg(OH)$_2$). Further, within this method, in embodiments where both a first absorption reactor and a second absorption reactor are utilized, and where segregation of the first and second hydroxide sorbents is maintained following CO$_2$ exposure in the first and second absorption reactors, it is not necessary that the first hydroxide sorbent and the second hydroxide sorbent be materials having substantially the same composition, provided that in both the first absorption reactor and the second absorption reactor, the first and second hydroxide sorbents act to absorb CO$_2$ and release H$_2$O via reaction (2) under the prevailing conditions. In a particular embodiment, the first hydroxide sorbent and the second hydroxide sorbent are magnesium hydroxide.

Similar to the first absorption vessel, the second absorption vessel 223 may be any vessel known in the art and sufficient to accept a gaseous stream, initiate contact between the gaseous stream and the hydroxide sorbent contained within, and discharge a gaseous stream subsequent to the contact, while maintaining pressure and temperature conditions sufficient for reaction (2) to proceed as a result of the contact. Additionally, second hydroxide sorbent 210 may be utilized in second absorption reactor 223 in a batch or continuous fashion. In the embodiment illustrated at FIG. 2, the second hydroxide sorbent 210 enters second absorption reactor 223 at second inlet 209 and the resulting second solid carbonate exits at second outlet 222 in a continuous fashion. Transport may be accomplished in a variety of ways, including moving bed arrangements, fluidized transfer of pellets, or other means known to those skilled in the art. Further, similar to the first absorption vessel, the material exiting at second outlet 209 may be comprised of both second solid carbonate and unreacted second hydroxide sorbent, with the extent depending on the sorbent utilization factor for second hydroxide sorbent 210.

As discussed, the CO$_2$ absorption occurring within first absorption reactor 212 and second absorption reactor 223 via reaction (2) is an exothermic process, and heat transfer from first absorption reactor 212 and second absorption reactor 223 may be required in order to maintain the CO$_2$ absorption conditions necessary. When utilized in this method, the heat transfers may be accomplished using a variety of heat sink means known in the art. For example, the heat sink could be a coolant fluid in a heat exchanger, another process technology requiring heat at about or less than the temperature of adsorption, or simply the atmosphere. Non-absorbed components of the respective gas streams which contact the hydroxide sorbents may also remove some exothermic heat during adsorption.

In a particular embodiment of the method as illustrated at FIG. 2, first absorption reactor 212 and second absorption reactor 223 are maintained at a temperature of about 210° C. and a pressure of about 280 psig, and first hydroxide sorbent 208 and second hydroxide sorbent 210 is magnesium hydroxide. First gaseous stream 202 is a syngas stream comprised of approximately 27.2% CO, 11.9% CO$_2$, 26.5% H$_2$, and 34.4% H$_2$O, where quantities are represented as mole percentages. First gaseous stream 202 enters first absorption reactor 212, and second gaseous stream 207 comprised of 27.2% CO, 0.6% CO$_2$, 26.5% H$_2$, and 45.7% H$_2$O is discharged. Second gaseous stream 207 enters water-gas shift reactor 201 and undergoes reaction (1), producing third gaseous stream 203 comprised of 0.2% CO, 27.6% CO$_2$, 53.5% H$_2$, and 18.7% H$_2$O. Third gaseous stream enters second absorption reactor 223, and fourth gaseous stream 211 comprised of 53.5.5% H$_2$ and 44.8% H$_2$O is discharged. In this embodiment, first gaseous stream 202, second gaseous stream 207, third gaseous stream 203, and fourth gaseous stream 211 have a total molar flow of 31,160,548 mol/h, the first hydroxide sorbent 208 enters first absorption reactor 212 at a rate of 972,992 kg/h, and the second hydroxide sorbent 210 enters the second absorption reactor 223 at a rate of 2,042,574 kg/h. A 31% sorbent utilization factor is assumed, which was observed in experimental testing.

In a further embodiment, the first and second hydroxide sorbents are regenerable CO$_2$ sorbents, such that the CO$_2$ absorbed in the first and second absorption reactions may be released during regeneration, and a concentrated gaseous CO$_2$ stream may be generated. One appropriate regenerable cycle for use in conjunction with the method of this disclosure is described in U.S. patent application Ser. No. 12/720,766, filed Mar. 10, 2010 and incorporated herein by reference. This process is represented generally at FIG. 3.

Figure 3:
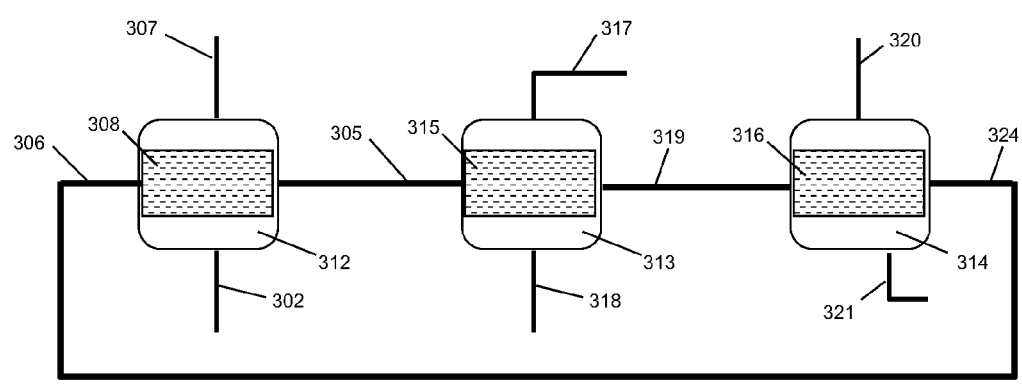
FIG. 3 illustrates regeneration of a hydroxide sorbent from an absorption reactor using a regeneration reactor and a polishing reactor.

Briefly, FIG. 3 illustrates an absorption reactor 312, a regeneration reactor 313, and a polishing reactor 314. Absorption reactor 312 is analogous to first absorption reactor 212 or second absorption reactor 223 discussed earlier. Absorption reactor 312 contains a hydroxide sorbent 308, receives a first gaseous stream 302 comprised of CO and CO$_2$, and produces second gaseous stream 307 comprised largely of CO and H$_2$O, and possibly some remaining unabsorbed CO$_2$. As a result, second gaseous stream 307 has a higher H$_2$O content and reduced CO$_2$ content as compared to first gaseous stream 302. At FIG. 3, hydroxide sorbent 308 enters absorption reactor 312 through absorption reactor inlet 306, contacts first gaseous stream 302, undergoes reaction (2), and solid carbonate exits absorption reactor 312 through absorption reactor exit 305. The solid carbonate exiting through absorption reactor exit 305 may also be comprised of some portion of the unreacted hydroxide sorbent 308, depending on the sorbent utilization factor in absorption reactor 312. In an embodiment, the hydroxide sorbent is Mg(OH)$_2$, and the absorption reactor 312 is maintained at a temperature of from about 150° C. to about 315° C. and a pressure greater than about 10 atmospheres.

Having exited absorption reactor 312, the solid carbonate is transferred to regeneration reactor 313. Regeneration reactor 313 establishes contact between the solid carbonate 315 within regeneration reactor 313 and a steam flow, received from steam inlet 318. Within regeneration reactor 313, the reactions (3) and (4) are expected, and reaction (5) may also occur:

$$MCO_3 \rightarrow MO + CO_2 \qquad (3)$$

$$MO + H_2O \rightarrow M(OH)_2 \qquad (4)$$

$$MCO_3 + H_2O \rightarrow M(OH)_2 + CO_2 \qquad (5)$$

where M is the metal comprising the hydroxide sorbent 308 utilized for CO2 absorption via reaction (2) in absorption reactor 312.

The steam flow provides heat duty for the decomposition of solid carbonate 315 to an oxide and gaseous CO$_2$ via reaction (3), or via reaction (5) to a hydroxide and gaseous CO$_2$, and further provides H$_2$O to hydroxylate a portion of the oxide to the hydroxide via reaction (4). Additionally, the steam flow serves to flush liberated CO$_2$ out of regeneration reactor 313 through CO$_2$ discharge path 317. As a result, a stream of concentrated CO$_2$ and H$_2$O is produced via CO$_2$ discharge path 317. In an embodiment, the hydroxide sorbent is Mg(OH)$_2$, and the regeneration reactor 313 is maintained at a temperature of greater than about 375° C. and a pressure greater than about 10 atmospheres.

The hydroxide and the remaining oxide are transferred from regeneration reactor 313 to polishing reactor 314 via transfer path 319 to complete rehydroxylation and fully regenerate the hydroxide sorbent. Polishing reactor 314 receives rehydroxylation stream 320 comprised of $H_2O$ and provides a temperature and pressure condition more favorable for the complete rehydroxylation of the remaining oxide. In an embodiment, the hydroxide sorbent is $Mg(OH)_2$, and the polishing reactor 314 is maintained at a temperature of from about 150° C. to about 315° C. and a pressure greater than about 10 atmospheres. In another embodiment, rehydroxylation stream 320 is comprised of second gaseous stream 307, so that $H_2O$ liberated by the absorption of $CO_2$ in absorption reactor 312 is utilized for rehydroxylation in polishing reactor 314, and so that rehydroxylation stream 320 is further comprised of the $H_2$ contained in second gaseous stream 307. In this embodiment, the rehydroxylation reaction in polishing reactor 314 reduces the $H_2O$ concentration, and the $H_2$ and some remaining $H_2O$ are discharged as a fuel stream through fuel exit 321. Concurrently, a regenerated hydroxide sorbent 316 exits polishing reactor 314 through polishing reactor exit 324. The regenerated hydroxide sorbent is recycled back to absorption reactor 312 for reuse in a cyclical process. Rehydroxylation stream 320 may additionally be comprised of excess steam not utilized by a component operating externally to FIG. 3, such as a WGS reactor.

Such a process as described generally above and specifically in U.S. patent application Ser. No. 12/720,766 may be utilized in conjunction with the method of this disclosure in order to produce $H_2$ from syngas using a water-gas shift reactor while providing a dense, $CO_2$ rich stream for sequestration or other purposes. It is understood, however, that within this disclosure, when a regenerable sorbent cycle such as that illustrated at FIG. 3 is utilized, the hydroxide sorbent may be any alkaline or alkaline earth metal hydroxide, provided that reaction (2) occurs to some degree within absorption reactor 312, and reactions (3) and (4) occur to some degree within regeneration reactor 313 as a result of the steam flow received from steam inlet 318, and reaction (4) occurs to some degree within polishing reactor 314 as a result of rehydroxylation stream 320.

Figure 4:
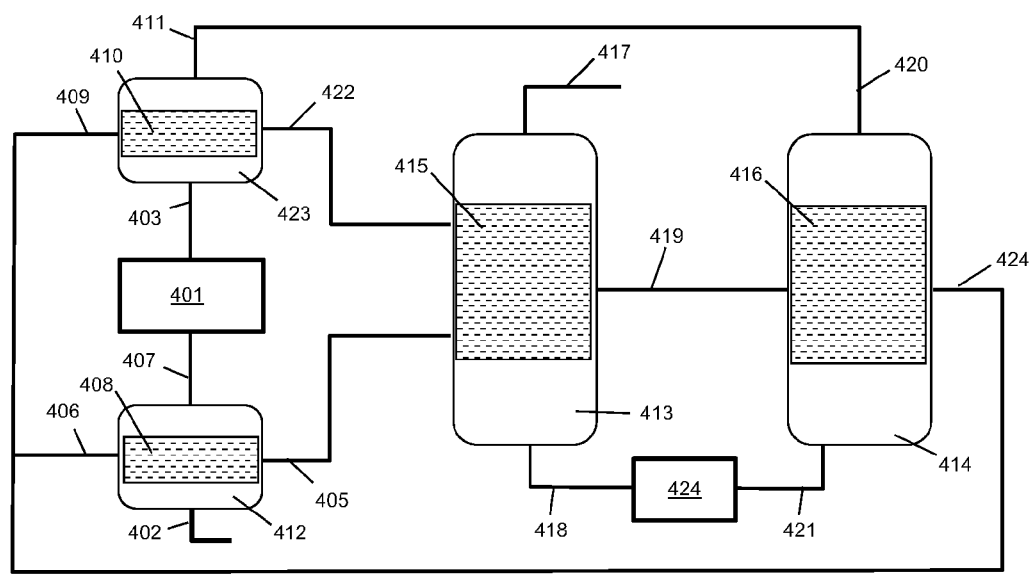
FIG. 4 illustrates regeneration of a first hydroxide sorbent and a second hydroxide sorbent from a first absorption reactor and a second absorption reactor using a regeneration reactor and a polishing reactor.

When a regenerable $CO_2$ sorbent is utilized in conjunction with the method described herein, the regeneration cycle such as that depicted at FIG. 3 may be solely dedicated to a first absorption reactor or a second absorption reactor, or when feasible, elements within the regeneration cycle may serve combined duty. As an example, FIG. 4 illustrates a similar cycle to that depicted at FIG. 3, where a regeneration cycle serves a first absorption reactor 412 and a second absorption reactor 423, in an embodiment of the disclosed method utilizing both a first and second absorption reactor for the production of an enriched $H_2$ stream. At FIG. 4, first absorption reactor 412 receives first gaseous stream 402 comprised of CO and $CO_2$, and contains first hydroxide sorbent 408 comprised of a first hydroxide. First hydroxide sorbent 408 enters first absorption reactor 412 at inlet 406. As previously discussed, first absorption reactor 412 discharges second gaseous stream 407 with increased $H_2O$ content and reduced $CO_2$ content to water-gas shift reactor 401, where $H_2$ is generated via reaction (1), producing $H_2$ and $CO_2$ in third gaseous stream 403. Third gaseous stream 403 enters second absorption reactor 423 containing second hydroxide sorbent 410 comprised of a second hydroxide entering at second inlet 409, and fourth gaseous stream 411 is discharged. Fourth gaseous stream 411 is primarily comprised of $H_2$ and $H_2O$. In an embodiment, the first hydroxide sorbent 408 and the second hydroxide sorbent 410 are $Mg(OH)_2$, and the first absorption reactor 412 and the second absorption reactor 423 are maintained at a temperature of from about 150° C. to about 315° C. and a pressure greater than about 10 atmospheres.

At FIG. 4, where first absorption reactor 412 contains first hydroxide sorbent 408 and second absorption reactor 423 contains second hydroxide sorbent 410, absorption of $CO_2$ produces first solid carbonate in first absorption reactor 412 and second solid carbonate in second absorption reactor 423 via reaction (2), as discussed previously. In this embodiment, first hydroxide sorbent 408 and second hydroxide sorbent 410 are substantially identical compositionally, such that the first and second solid carbonates produced via reaction (2) are similarly identical compositionally. The first solid carbonate is then transferred from first absorption reactor 412 to regeneration reactor 413 via first absorption reactor exit 405, and the second solid carbonate is transferred from second absorption reactor 423 to regeneration reactor 413 via second absorption reactor exit 422. Transport may be accomplished in a variety of ways, including moving bed arrangements, fluidized transfer of pellets, or other means known to those skilled in the art.

Regeneration reactor 413 receives a steam flow from steam inlet 418, providing heat duty for solid carbonate decomposition and rehydroxylation of some portion of the decomposition products back to the composition of the hydroxide sorbent, as before. Within regeneration reactor 413, the first solid carbonate decomposes via reaction (3) to produce a first oxide and gaseous $CO_2$, generating a first separation stream within regeneration reactor 413, where the first separation stream comprises the gaseous $CO_2$ from the first solid carbonate. Additionally, the second solid carbonate decomposes via reaction (3) to produce a second oxide and gaseous $CO_2$, generating a second separation stream within regeneration reactor 413, where the second separation stream comprises the gaseous $CO_2$ from the second solid carbonate. Some portion of the first and second solid carbonates may also decompose via reaction (5). The steam flow further serves to flush the gaseous $CO_2$ out of regeneration reactor 413 through $CO_2$ discharge path 417, thereby withdrawing the first separation stream and the second separation stream from regeneration reactor 413, and producing a stream of concentrated $CO_2$ and $H_2O$ via $CO_2$ discharge path 417. Additionally, the steam flow provides $H_2O$ for rehydroxylating a portion of the first oxide to form a third hydroxide, and for rehydroxylating a portion of the second oxide to form a fourth hydroxide.

The regeneration reactor 413 thus contains a partially regenerated sorbent 415 comprised of the third hydroxide, a remaining first oxide, the fourth hydroxide, and a remaining second oxide. In an embodiment, the third and fourth hydroxides are $Mg(OH)_2$, the remaining first and second oxides are MgO, and the regeneration reactor 413 is maintained at a temperature of greater than about 375° C. and a pressure greater than about 10 atmospheres.

The partially regenerated sorbent is then transferred from regeneration reactor 413 to polishing reactor 414 via regeneration reactor exit 419. Polishing reactor 414 further receives a rehydroxylation stream 420 comprised of $H_2O$. In the embodiment shown, the hydroxylation stream 420 is comprised of the fourth gaseous stream 411, and contains $H_2$ and $H_2O$ remaining subsequent to the $CO_2$ absorption in second absorption reactor 423. Within polishing reactor 414, the $H_2O$ present in rehydroxylation stream 420 more fully rehydroxylates the partially regenerated sorbent, such that the first remaining oxide forms a fifth magnesium hydroxide and the second remaining oxide forms a sixth magnesium hydroxide. Polishing reactor 414 thus contains a regenerated sorbent 416 comprised of the third magnesium hydroxide and the fourth magnesium hydroxide produced by rehydroxylation in regeneration reactor 413, and further comprised of the fifth magnesium hydroxide and the sixth magnesium hydroxide rehydroxylated in polishing reactor 414. In an embodiment, the third, fourth, fifth, and sixth hydroxides are $Mg(OH)_2$, the remaining first and second oxides are MgO, and the polishing reactor 414 is maintained at a temperature of from about 150° C. to about 315° C. and a pressure greater than about 10 atmospheres. The regenerated sorbent 416 is then transferred to the first absorption reactor 412 and the second absorption reactor 423 for continued service in the cyclic process.

In the embodiment shown at FIG. 4, as rehydroxylation stream 420 comprised of $H_2$ and $H_2O$ from fourth gaseous stream 411 passes through polishing reactor 414, rehydroxylation of the first remaining oxide and the second remaining oxide reduces the $H_2O$ content. Following the rehydroxylation, a fuel stream 421 comprised of the $H_2$ and a reduced amount of $H_2O$ is discharged from polishing reactor 414 to a power island 424, where the $H_2$ in the fuel stream may be utilized for the generation of electrical power. At FIG. 4, power island 424 also provides steam for the steam injection through steam inlet 418. The power island 421 may be, for example, an IGCC plant generating steam as a result of syngas cooling and generating electrical power from the combustion of hydrogen.

It is understood that in embodiments such as illustrated at FIGS. 3 and 4, the terms "first hydroxide," "second solid carbonate," and the like are not intended to indicate a chemical composition, but are merely intended to indicated the origin of a compound. Within this disclosure, a "first hydroxide" is a hydroxide participating in reaction (2) in a first absorption reactor, a "second hydroxide" is a hydroxide participating in reaction (2) in a second absorption reactor, a "third hydroxide" is a hydroxide created by reaction (4) resulting from a first oxide exposed to steam in a regeneration reactor, a "fourth hydroxide" is a hydroxide created by reaction (4) resulting from a second oxide exposed to steam in a regeneration reactor, a "fifth hydroxide" is a hydroxide created by reaction (4) resulting from a first remaining oxide exposed to a rehydroxylation stream in a polishing reactor, and a "sixth hydroxide" is a hydroxide created by reaction (4) resulting from a second remaining oxide exposed to a rehydroxylation stream in a polishing reactor. Similarly, a "first solid carbonate" refers to a carbonate produced from $CO_2$ and a first hydroxide from reaction (2) in a first absorption reactor, and a "second solid carbonate" refers to a carbonate produced from $CO_2$ and a second hydroxide from reaction (2) in a second absorption reactor. Similarly, a "first oxide" refers to an oxide produced by the thermal decomposition of a first hydroxide via reaction (3) in a regeneration reactor, and a "second oxide" refers to an oxide produced by the thermal decomposition of a second hydroxide via reaction (3) in a regeneration reactor.

In an embodiment, the first, second, third, fourth, fifth and sixth hydroxides have the chemical composition $Mg(OH)_2$, the first and second solid carbonates have the chemical composition $MgCO_3$, and the first and second oxides and the first and second remaining oxides have the chemical composition MgO.

As before, first gaseous stream 402 may be further comprised of some amount of existing $H_2$ and $H_2O$, so that the process as described above acts to increase the concentration of $H_2O$ prior to water-gas-shift reactor 401 and increase the concentration of $H_2$ following the water-gas-shift reactor 401, while decreasing the concentration of $CO_2$ via reaction (2). For example, first gaseous stream 402 may be a syngas stream comprised primarily of $H_2$, CO, $CO_2$, and $H_2O$, such that the third gaseous stream 403 is a shifted syngas comprised primarily of $H_2$, $CO_2$, and $H_2O$, and such that fourth gaseous stream 411 is a concentrated $H_2$ stream comprised primarily of $H_2$ and $H_2O$, and such that the fuel stream 421 is a concentrated stream comprised of $H_2$ and a reduced amount of $H_2O$.

It is further understood that in an embodiment such as illustrated at FIG. 4, heat transfer operations may be required in order to maintain temperature and pressure conditions sufficient for reactions (1) through (4) to proceed as described. For example, in an embodiment utilizing magnesium hydroxide as first hydroxide sorbent 408 and second hydroxide sorbent 410, $CO_2$ absorption in first absorption reactor 412 and second absorption reactor 423 may occur at an approximate temperature of about 210° C., while $CO_2$ liberation via steam flow may occur in regeneration reactor 413 at an approximate temperature of about 400° C., and final rehydroxylation may occur in polishing reactor 414 at an approximate temperature of about 210° C. As a result, during transfer of materials through the cycle, indirect heat exchange may be utilized to increase the efficiency of the process. For example, an indirect heat exchange may occur between the solid magnesium carbonate at approximately 210° C. being transferred to the regeneration reactor and the concentrated $CO_2$ stream at approximately 400° C. exiting the regeneration reactor, so that the solid magnesium carbonate may be heated to a temperature closer to the regeneration temperature required, and heat duty requirements for the steam injected into the regeneration reactor can be reduced. Similarly, the solid magnesium carbonate may undergo indirect heat exchange with the partially regenerated sorbent at approximately 400° C. transferred from the regeneration reactor to the polishing reactor, reducing the heat duty required in the regeneration reactor and reducing any necessary heat transfer from the lower temperature polishing reactor. Heat exchange between the polishing reactor and the regeneration reactor via a heat transfer medium such as liquid water may also serve to both remove exothermic heat from the polishing reactor as reaction (4) proceeds and provide a portion of the necessary heat duty in the regeneration reactor to drive reaction (3) or reaction (5).

In a particular embodiment of the method as illustrated at FIG. 4, first absorption reactor 412 and second absorption reactor 423 are maintained at a temperature of about 210° C. and a pressure of about 280 psig, and first hydroxide sorbent 408 and second hydroxide sorbent 410 are magnesium hydroxide. First gaseous stream 402 is a syngas stream comprised of approximately 27.2% CO, 11.9% $CO_2$, 26.5% $H_2$, and 34.4% $H_2O$, where quantities are represented as mole percentages. First gaseous stream 402 enters first absorption reactor 412, and second gaseous stream 407 comprised of 27.2% CO, 0.6% $CO_2$, 26.5% $H_2$, and 45.7% $H_2O$ is discharged. Second gaseous stream 407 enters water-gas shift reactor 401 and undergoes reaction (1), producing third gaseous stream 403 comprised of 0.2% CO, 27.6% $CO_2$, 53.5% $H_2$, and 18.7% $H_2O$. Third gaseous stream 403 enters second absorption reactor 423, and fourth gaseous stream 411 comprised of 53.5% $H_2$ and 44.8% $H_2O$ is discharged. In this embodiment, first gaseous stream 402, second gaseous stream 407, third gaseous stream 403, and fourth gaseous stream 411 have a total molar flow of approximately 31,160, 548 mol/h, the first hydroxide sorbent 408 enters first absorption reactor 412 at a rate of 881,333 kg/h, and the second hydroxide sorbent 410 enters the second absorption reactor 423 at a rate of 2,042,574 kg/h. A 31% sorbent utilization factor is assumed, which was observed experimentally.

In the preceding embodiment, regeneration reactor 413 is maintained at a temperature of about 400° C. and a pressure of about 280 psig. First solid carbonate and second solid carbonate from first absorption reactor 412 and second absorption reactor 413 respectively are transferred to regeneration reactor 413 as $MgCO_3$ at a rate of 3,227,994 kg/h. Steam flow enters regeneration reactor 413 through from steam inlet 418 at a temperature of 550° C., a pressure of approximately 280 psig, and a rate of approximately 180,000 kg/h. Within regeneration reactor 413, the steam flow provides heat duty for the decomposition of $MgCO_3$ to MgO and partial rehydroxylation, and partially regenerated sorbent comprised of approximately 50% $Mg(OH)_2$ and 50% MgO exits regeneration reactor 413 via regeneration reactor exit 419 at a rate of approximately 2,803,596 kg/h. Concurrently, a concentrated $CO_2$ stream comprised of 87% $CO_2$ and 13% $H_2O$ exits regeneration reactor 413 via $CO_2$ discharge path 417 at a rate of approximately 589,347 kg/h.

In the preceding embodiment, polishing reactor 414 receives the partially regenerated sorbent via regeneration reactor exit 419 at a rate of 2,803,596 kg/h and further receives fourth gaseous stream 411, comprised of 53.5.5% $H_2$ and 44.8% $H_2O$ at a rate of 31,171,436 mol/h, or 305,982 kg/h. Polishing reactor 414 utilizes the water product in gaseous stream 411 for rehydroxylation of the remaining magnesium oxide in partially regenerated sorbent 416. Following the rehydroxylation, a regenerated $Mg(OH)_2$ sorbent exits via polishing reactor exit 424 at a rate of 2,923,907 kg/h, of which 881,333 kg/h is returned to first absorption reactor 412 and 2,042,574 kg/h is returned to second absorption reactor 423, for reuse in the cyclic $CO_2$ absorption cycle. Concurrently, fuel stream 421 comprised of approximately 66% $H_2$, 32% $H_2O$, balance $CO_2$ and CO, discharges approximately 16,930,140 mol/h (130,784 kg/h) $H_2$ to power island 424.

Thus, the disclosure herein utilizes a hydroxide sorbent for humidification and $CO_2$ removal from a gaseous stream comprised of CO and $CO_2$ prior to entry into a water-gas-shift reactor, in order to decrease $CO_2$ concentration and increase $H_2O$ concentration and shift the water-gas shift reaction toward the forward reaction products $CO_2$ and $H_2$. The disclosure further utilizes the hydroxide sorbent for absorption of $CO_2$ exiting the water-gas shift reactor, producing an enriched $H_2$ stream. The process further provides for regeneration of the hydroxide sorbent at temperature approximating water-gas shift conditions, and utilizing $H_2O$ product liberated as a result of the $CO_2$ absorption, reducing energy requirements associated with the $CO_2$ capture and sequestration, and reducing water requirements for rehydroxylation during the regeneration.

Accordingly, the disclosure provides a process whereby a gaseous stream comprised of CO and $CO_2$ can be humidified prior to entering a WGS reactor, in order to reduce or eliminate parasitic steam injection into the gaseous stream.

Further, the disclosure provides a process whereby CO2 removal from a gaseous stream comprised of CO and $CO_2$ can be accomplished during the humidification process, in order to shift the water-gas shift reaction toward the favorable forward reaction products.

Further, the disclosure provides for utilizing a sorbent material for both $CO_2$ absorption and humidification of the gaseous stream prior to entry into the WGS reactor, and further utilizing the sorbent material for $CO_2$ capture following exit from the WGS reactor, in order to produce an enriched $H_2$ stream.

Further, the disclosure provides for conducting $CO_2$ absorption, gaseous stream humidification, and $CO_2$ capture following the WGS reactor using a sorbent regenerable at approximate WGS reactor temperature and pressure conditions, in order to mitigate energy penalties associated with $CO_2$ capture and sequestration.

Further, the disclosure provides for conducting $CO_2$ absorption, gaseous stream humidification, and $CO_2$ capture using a sorbent which tolerates $H_2O$ in the gaseous stream, in order to mitigate water removal requirements and allow operation of $H_2O$ containing streams, such as a syngas stream comprised $H_2$, CO, $CO_2$, and $H_2O$.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of providing steam and absorbing $CO_2$ for $H_2$ production using a water gas shift reaction in a water gas shift reactor comprising:

contacting a first gaseous stream comprising CO and $CO_2$ with a first hydroxide in a first absorption reactor to produce a first solid carbonate and a first water product under a temperature condition such that the first water product exists as a generated steam, and producing a second gaseous stream comprising CO from the first gaseous stream, an amount of $CO_2$ less than the first gaseous stream, and the generated steam;

discharging the second gaseous stream from the first absorption reactor into the water gas shift reactor, where the water gas shift reactor is under a temperature and pressure condition sufficient to generate the water gas shift reaction between some portion of the CO from the first gaseous stream and some portion of the generated steam to produce a third gaseous stream comprising a generated $H_2$ and an amount of $CO_2$ greater than the second gaseous stream, and discharging the third gaseous stream from the water gas shift reactor to a second absorption reactor;

contacting the third gaseous stream with a second hydroxide in the second absorption reactor to produce a second solid carbonate and a second water product, and producing a fourth gaseous stream comprising generated $H_2$ from the third gaseous stream, the second water product, and an amount of $CO_2$ less than the third gaseous stream;

transferring the first solid carbonate from the first absorption reactor to a regeneration reactor and generating a first decomposition reaction by, heating the first solid carbonate to at least a temperature sufficient to decompose some portion of the first solid carbonate to produce a first oxide and gaseous carbon dioxide and, producing a third hydroxide by contacting the first oxide with steam, such that some portion of the first oxide reacts with water to produce the third hydroxide, and thereby producing a remaining first oxide, where the remaining first oxide consists of the first oxide less the some portion of the first oxide consumed to produce the third hydroxide;

transferring the second solid carbonate from the second absorption reactor to the regeneration reactor and generating a second decomposition reaction by, heating the second solid carbonate to at least a temperature sufficient to decompose some portion of the second solid carbonate to produce a second oxide and gaseous carbon dioxide and, producing a fourth hydroxide by contacting the second oxide with steam, such that some portion of the second oxide reacts with water to produce the fourth hydroxide, thereby producing a remaining second oxide, where the remaining second oxide consists of the second oxide less the some portion of the second oxide consumed to produce the fourth hydroxide;

discharging a rehydroxylation stream comprising some portion of the second water product from the second absorption reactor, and directing the rehydroxylation stream to a polishing reactor; and transferring the first remaining oxide and the second remaining oxide from the regeneration reactor to the polishing reactor and rehydroxylating the first remaining oxide and the second remaining oxide by, generating a first rehydroxylation reaction by contacting the first remaining oxide with a first portion of the rehydroxylation stream at a temperature sufficient to cause some portion of the first remaining oxide to react with the first portion of the rehydroxylation stream to produce a fifth hydroxide and, generating a second rehydroxylation reaction by contacting the second remaining oxide with a second portion of the rehydroxylation stream at a temperature sufficient to cause some portion of the second remaining oxide to react with the second portion of the rehydroxylation stream to produce a sixth hydroxide, thereby providing steam and absorbing $CO_2$ for $H_2$ production using the water gas shift reaction in the water gas shift reactor.

2. The method of claim 1 where the first gaseous stream is further comprised of an initial amount of steam and an initial amount of hydrogen.

3. The method of claim 1 where the first hydroxide and the second hydroxide are magnesium hydroxide.

4. The method of claim 1 further comprising:
combining a first portion of the third hydroxide, a first portion of the fourth hydroxide, a first portion of the fifth hydroxide, and a first portion of the sixth hydroxide to produce a first regenerated hydroxide, and transferring the first regenerated hydroxide to the first absorption reactor, and repeating the contacting the first gaseous stream comprising CO and $CO_2$ with the first hydroxide in a first absorption reactor step using the first regenerated hydroxide as the first hydroxide; and
combining a second portion of the third hydroxide, a second portion of the fourth hydroxide, a second portion of the fifth hydroxide, and a second portion of the sixth hydroxide to produce a second regenerated hydroxide, and transferring the second regenerated hydroxide to the second absorption reactor, and repeating the contacting the third gaseous stream with the second hydroxide in the second absorption reactor step using the second regenerated hydroxide as the second hydroxide.

5. The method of claim 1 where the first hydroxide is magnesium hydroxide, the second hydroxide is magnesium hydroxide, and where the first absorption reactor and the second absorption reactor are at a temperature from about 150° C. to about 315° C., and where the regeneration reactor is at a temperature of at least 375° C., and where the polishing reactor is at a temperature from about 150° C. to about 315° C.

6. The method of claim 1 where the first hydroxide is magnesium hydroxide, and where the first absorption reactor and the second absorption reactor are at a pressure greater than 10 atmospheres, and where the regeneration reactor is at a pressure greater than 10 atmospheres, and where the polishing reactor is at a pressure greater than 10 atmospheres.

7. The method of claim 1 where the rehydroxylation stream is further comprised of some portion of the generated $H_2$ and including, following the first hydroxylation reaction and the second hydroxylation reaction, generating a gaseous fuel stream, where the gaseous fuel stream is comprised of the rehydroxylation stream less the some portion of the second water product consumed in the first hydroxylation reaction and less the some portion of the second water product consumed in the second hydroxylation reaction, and discharging the gaseous fuel stream from the polishing reactor to a power island combusting at least a portion of the gaseous fuel stream and producing power plant steam from the power island, and utilizing some portion of the power plant steam as the steam for the first decomposition reaction and the steam for the second decomposition reaction.

8. The method of claim 1 including concentrating absorbed $CO_2$ by:
withdrawing a first separation stream from the regeneration reactor following the first decomposition reaction, where the first separation stream is comprised of gaseous carbon dioxide from the first decomposition reaction; and
withdrawing a second separation stream from the regeneration reactor following the second decomposition reaction, where the second separation stream is comprised of gaseous carbon dioxide from the second decomposition reaction.

9. A method of providing steam and absorbing $CO_2$ for $H_2$ production using a water gas shift reaction in a water gas shift reactor comprising:
contacting a first gaseous stream comprising CO and $CO_2$ with a first hydroxide in a first absorption reactor to produce a first solid carbonate and a first water product, where the first absorption reactor is at a temperature from about 150° C. to about 315° C. and where the first water product exists as a generated steam, and producing a second gaseous stream comprising CO from the first gaseous stream, an amount of $CO_2$ less than the first gaseous stream, and the generated steam;
discharging the second gaseous stream from the first absorption reactor into the water gas shift reactor, where the water gas shift reactor is under a temperature and pressure condition sufficient to generate the water gas shift reaction between some portion of the CO from the first gaseous stream and some portion of the generated steam to produce a third gaseous stream comprising a generated $H_2$ and an amount of $CO_2$ greater than the second gaseous stream, and discharging the third gaseous stream from the water gas shift reactor to a second absorption reactor;
contacting the third gaseous stream with a second hydroxide in the second absorption reactor to produce a second solid carbonate and a second water product, where the second absorption reactor is at a temperature from about 150° C. to about 315° C., and producing a fourth gaseous stream comprising generated $H_2$ from the third gaseous stream, the second water product, and an amount of $CO_2$ less than the third gaseous stream;

transferring the first solid carbonate from the first absorption reactor to a regeneration reactor, where the regeneration reactor is at a temperature of at least 375° C., and generating a first decomposition reaction by, heating the first solid carbonate to at least a temperature sufficient to decompose some portion of the first solid carbonate to produce a first oxide and gaseous carbon dioxide and, producing a third hydroxide by contacting the first oxide with steam, such that some portion of the first oxide reacts with water to produce the third hydroxide, and thereby producing a remaining first oxide, where the remaining first oxide consists of the first oxide less the some portion of the first oxide consumed to produce the third hydroxide;

transferring the second solid carbonate from the second absorption reactor to the regeneration reactor, where the regeneration reactor is at a temperature of at least 375° C., and generating a second decomposition reaction by, heating the second solid carbonate to at least a temperature sufficient to decompose some portion of the second solid carbonate to produce a second oxide and gaseous carbon dioxide and, producing a fourth hydroxide by contacting the second oxide with steam, such that some portion of the second oxide reacts with water to produce the fourth hydroxide, thereby producing a remaining second oxide, where the remaining second oxide consists of the second oxide less the some portion of the second oxide consumed to produce the fourth hydroxide;

discharging a rehydroxylation stream comprising some portion of the second water product from the second absorption reactor, and directing the rehydroxylation stream to a polishing reactor; and transferring the first remaining oxide and the second remaining oxide from the regeneration reactor to the polishing reactor, where the polishing reactor is at a temperature of from about 150° C. to about 315° C., and rehydroxylating the first remaining oxide and the second remaining oxide by, generating a first rehydroxylation reaction by contacting the first remaining oxide with a first portion of the rehydroxylation stream at a temperature sufficient to cause some portion of the first remaining oxide to react with the first portion of the rehydroxylation stream to produce a fifth hydroxide and, generating a second rehydroxylation reaction by contacting the second remaining oxide with a second portion of the rehydroxylation stream at a temperature sufficient to cause some portion of the second remaining oxide to react with the second portion of the rehydroxylation stream to produce a sixth hydroxide, thereby providing steam and absorbing $CO_2$ for $H_2$ production using the water gas shift reaction in the water gas shift reactor.

10. The method of claim 9 further comprising,
combining the third hydroxide and the fifth hydroxide to produce a first regenerated hydroxide, and transferring the first regenerated hydroxide to the first absorption reactor, and repeating the contacting the first gaseous stream comprising CO and $CO_2$ with the first hydroxide in the first absorption reactor step using the first regenerated hydroxide as the first hydroxide; and combining the fourth hydroxide and the sixth hydroxide to produce a second regenerated hydroxide, and transferring the second regenerated hydroxide to the second absorption reactor, and repeating the contacting the third gaseous stream with the second hydroxide in the second absorption reactor step using the second regenerated hydroxide as the second hydroxide.

11. The method of claim 10 where the first hydroxide is magnesium hydroxide and the second hydroxide is magnesium hydroxide, and where the first absorption reactor and the second absorption reactor and the polishing reactor are at a pressure greater than about 10 atmospheres.

12. The method of claim 9 further comprising:
directing a steam flow to the regeneration reactor;
combining a first portion of the third hydroxide, a first portion of the fourth hydroxide, a first portion of the fifth hydroxide, and a first portion of the sixth hydroxide to produce a first regenerated hydroxide, and transferring the first regenerated hydroxide to the first absorption reactor, and repeating the contacting the first gaseous stream comprising CO and $CO_2$ with the first hydroxide in the first absorption reactor step using the first regenerated hydroxide as the first hydroxide; and combining a second portion of the third hydroxide, a second portion of the fourth hydroxide, a second portion of the fifth hydroxide, and a second portion of the sixth hydroxide to produce a second regenerated hydroxide, and transferring the second regenerated hydroxide to the second absorption reactor, and repeating the contacting the third gaseous stream with the second hydroxide in the second absorption reactor step using the second regenerated hydroxide as the second hydroxide.

13. The method of claim 12 where the first hydroxide is magnesium hydroxide and the second hydroxide is magnesium hydroxide, and where the first absorption reactor and the second absorption reactor and the polishing reactor are at a pressure greater than about 10 atmospheres.

14. The method of claim 9 where the rehydroxylation stream is further comprised of some portion of the generated $H_2$ and including, following the first hydroxylation reaction and the second hydroxylation reaction, generating a gaseous fuel stream, where the gaseous fuel stream is comprised of the rehydroxylation stream less the some portion of the second water product consumed in the first hydroxylation reaction and less the some portion of the second water product consumed in the second hydroxylation reaction, and discharging the gaseous fuel stream from the polishing reactor to a power island combusting at least a portion of the gaseous fuel stream and producing power plant steam from the power island, and utilizing some portion of the power plant steam as the steam for the first decomposition reaction and the steam for the second decomposition reaction.

15. The method of claim 9 including concentrating absorbed $CO_2$ by:
withdrawing a first separation stream from the regeneration reactor following the first decomposition reaction, where the first separation stream is comprised of gaseous carbon dioxide from the first decomposition reaction; and withdrawing a second separation stream from the regeneration reactor following the second decomposition reaction, where the second separation stream is comprised of gaseous carbon dioxide from the second decomposition reaction.

16. A method of providing steam and absorbing $CO_2$ for $H_2$ production using a water gas shift reaction in a water gas shift reactor comprising:
contacting a first gaseous stream comprising CO and $CO_2$ with a first hydroxide in an absorption reactor to produce a solid carbonate and a water product under a temperature condition such that the water product exists as a generated steam, and producing a second gaseous stream comprising CO from the first gaseous stream, an amount of $CO_2$ less than the first gaseous stream, and the generated steam;

discharging the second gaseous stream from the absorption reactor into the water gas shift reactor, where the water gas shift reactor is under a temperature and pressure condition sufficient to generate the water gas shift reaction between some portion of the CO from the first gaseous stream and some portion of the generated steam to produce a third gaseous stream comprising a generated $H_2$, an amount of $CO_2$ greater than the second gaseous stream, and an amount of the water product, and discharging the third gaseous stream from the water gas shift reactor;

absorbing some portion of the $CO_2$-comprising third gaseous stream and producing a fourth gaseous stream comprising generated $H_2$ from the third gaseous stream and some portion of the amount of the water product, and an amount of $CO_2$ less than the third gaseous stream;

transferring the solid carbonate from the absorption reactor to a regeneration reactor and generating a decomposition reaction by, heating the solid carbonate to at least a temperature sufficient to decompose some portion of the solid carbonate to produce an oxide and gaseous carbon dioxide and, producing a second hydroxide by contacting the oxide with steam, such that some portion of the oxide reacts with water to produce the second hydroxide, and thereby producing a remaining oxide, where the remaining oxide consists of the oxide less the some portion of the oxide consumed to produce the second hydroxide;

directing a rehydroxylation stream comprising a quantity of the some portion of the amount of the water product in the fourth gaseous stream to a polishing reactor;

transferring the remaining oxide from the regeneration reactor to the polishing reactor; and rehydroxylating the remaining oxide by contacting the remaining oxide with the rehydroxylation stream at a temperature sufficient to cause some portion of the remaining oxide to react with the rehydroxylation stream to produce a third hydroxide, thereby providing steam and absorbing $CO_2$ for $H_2$ production using the water gas shift reaction in the water gas shift reactor.

17. The method of claim 16 where the first hydroxide, the second hydroxide, and the third hydroxide is magnesium hydroxide, and where the absorption reactor is at a temperature from about 150° C. to about 315° C. and a pressure greater than 10 atmospheres, and where the regeneration reactor is at a temperature of at least 375° C. and a pressure greater than 10 atmospheres, and where the polishing reactor is at a temperature from about 150° C. to about 315° C. and a pressure greater than 10 atmospheres.

\* \* \* \* \*